UNITED STATES PATENT OFFICE.

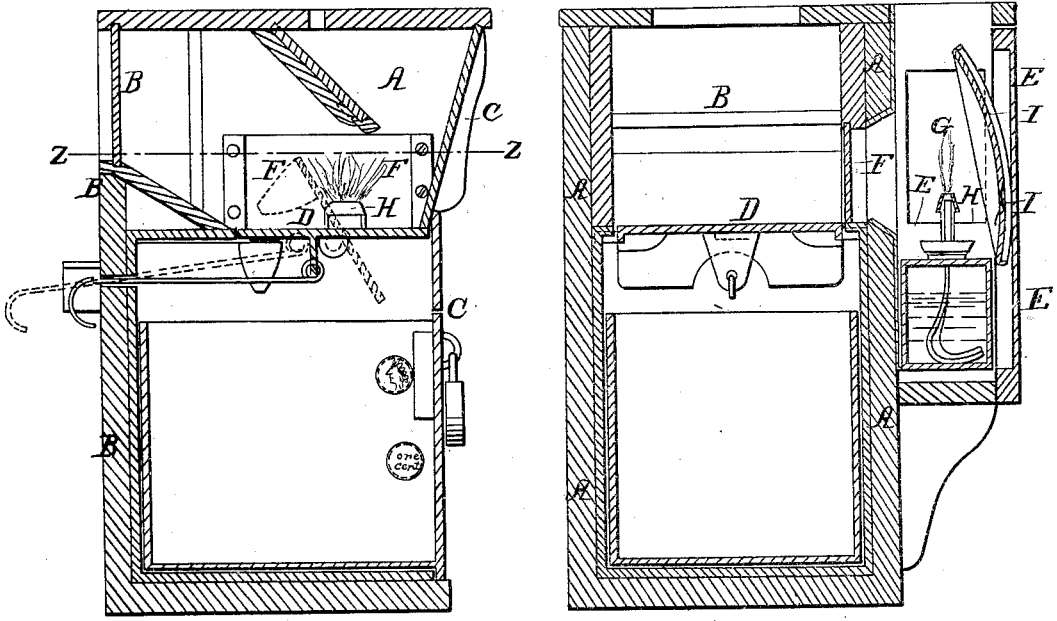

JOHN B. SLAWSON, OF NEW ORLEANS, LOUISIANA.

IMPROVED CAR AND OMNIBUS FARE-BOX.

Specification forming part of Letters Patent No. 69,263, dated September 24, 1867.

*To all whom it may concern:*

Be it known that I, JOHN B. SLAWSON, of New Orleans, in the parish of Orleans and State of Louisiana, (at present residing in the city of New York,) have invented a new and Improved Car and Omnibus Fare-Box; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved fare-box, the plane of section being indicated by the line $x\ x$, Fig. 4. Fig. 2 is a vertical cross-section of the same, the plane of section being indicated by the line $y\ y$, Fig. 4. Fig. 3 is a front elevation of the same. Fig. 4 is a horizontal sectional view of the same, the plane of section being indicated by the line $z\ z$, Fig. 1.

Similar letters of reference indicate corresponding parts.

This invention relates to a fare-box for cars and omnibuses, which is so arranged that the lamp is altogether out of the way of the fare-box, so as not to obstruct the inspection of the contents of the box, and so that by the lamp sufficient light is thrown into the fare-box and upon the money-trap to completely illuminate the same.

The invention consists in arranging a receptacle for holding the lamp at one or both sides of the fare-box, and in leaving an opening between the box and such receptacle, which may be closed by glass or other transparent material, or by wire-netting or its equivalents. In each of these compartments is a reflector, by which the light is thrown through the opening in the side of the fare-box upon the money-trap, so that the latter will be very light, and the money thrown upon it may be inspected with ease by the driver as well as by the passenger.

Heretofore the lamps were placed directly into the fare-boxes, and blinded the eyes of the driver, and prevented him from seeing and inspecting the contents of the box. In the front of the lamp-holding attachment of the fare-box may be a small glass window, by which the driver will be enabled to see and count the change.

The fare-box may be of suitable construction, and this invention is not intended as an attachment to any one particular kind of fare-box, but may be used on fare-boxes of ordinary or suitable construction.

A A represent the side walls of a car or omnibus fare-box, of suitable construction. B is the front, and C the rear or inside, wall of the same.

D is the money-trap, which may be hinged or attached and operated in any suitable manner. The walls B and C are, above the money-trap, made of glass or other transparent or other material, so that the passengers, as well as the driver, may be enabled to inspect the contents of the box.

At the outside of the box is attached, to one of the side walls, A A, of the same, a small box or apartment, E, the inner wall of which is closed by a glass pane, F, or by any other transparent or other material, through which the light may be allowed to pass from E to the fare-box. The front wall of the apartment E may also have a pane of glass, G, or its equivalent, to give a direct light to the driver.

A lamp, H, of suitable construction is placed into the box or apartment E, and its light is thrown, by strong reflectors I, of suitable construction, through the glass F, upon the money-trap D, so that the money upon the same can be easily inspected from the inside and outside.

If desired, reflectors may also be arranged opposite to the pane G. Such attachments E may be arranged on both or on only one side of the fare-box, as may be desired. The top of the apartment E is open to allow the escape of smoke from the lamp. That the smoke is thus kept entirely out of the fare-box is another great advantage of my invention.

It will be easily seen that the driver's eyes will not be blinded by the light of the lamp H while he is inspecting the inside of the fare-box.

If desired, a pane may also be arranged on the inside of the apartment E to throw light into the omnibus or car; or one may have an inside, the other an outside, pane, where two apartments, E, are used. Any one of the outer walls of the apartment E may be hinged, so that it can be opened to remove the lamp for cleaning and other purposes.

What I claim as new, and desire to secure by Letters Patent, is—

1. The apartment E, when provided with an opening for the passage of light toward the fare-box, and with a reflector, I, on the opposite wall, the lamp H being arranged between, substantially as described.

2. Providing the apartment E with openings F and G, for allowing the passage of light toward the fare-box and toward the front, (or rear,) substantially as and for the purpose herein shown and described.

J. B. SLAWSON.

Witnesses:
  A. V. BRIESEN,
  ALEX. F. ROBERTS.